US011829424B2

(12) United States Patent
Raphael et al.

(10) Patent No.: US 11,829,424 B2
(45) Date of Patent: Nov. 28, 2023

(54) DISCOVERING LATENT CUSTODIANS AND DOCUMENTS IN AN E-DISCOVERY SYSTEM

(71) Applicant: International Business Machines Corporation, Armonk, NY (US)

(72) Inventors: Roger C. Raphael, San Jose, CA (US); Rajesh M. Desai, San Jose, CA (US); Nazrul Islam, San Jose, CA (US); Magesh Jayapandian, San Jose, CA (US); Jojo Joseph, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 16/795,678

(22) Filed: Feb. 20, 2020

(65) Prior Publication Data
US 2021/0263977 A1    Aug. 26, 2021

(51) Int. Cl.
*G06F 16/93* (2019.01)
*G06Q 50/18* (2012.01)
*G06F 16/906* (2019.01)

(52) U.S. Cl.
CPC ............ *G06F 16/93* (2019.01); *G06F 16/906* (2019.01); *G06Q 50/18* (2013.01)

(58) Field of Classification Search
CPC ........ G06F 16/93; G06F 16/906; G06Q 50/18
See application file for complete search history.

(56) References Cited

U.S. PATENT DOCUMENTS

| 8,583,669 | B2 | 11/2013 | Kumar |
| 8,832,126 | B2 | 9/2014 | Kumar et al. |
| 9,483,550 | B1 | 11/2016 | Sonie |
| 2008/0208847 | A1* | 8/2008 | Moerchen ............. G06F 16/313 707/999.005 |
| 2010/0250455 | A1 | 9/2010 | Richards et al. |
| 2010/0250456 | A1* | 9/2010 | Toomey ................. G06Q 10/10 707/723 |
| 2010/0251149 | A1 | 9/2010 | Mayer et al. |

(Continued)

FOREIGN PATENT DOCUMENTS

| EP | 2234045 A2 | 9/2010 |
| WO | WO2017106369 A1 | 6/2017 |

*Primary Examiner* — Apu M Mofiz
*Assistant Examiner* — Farhad Agharahimi
(74) *Attorney, Agent, or Firm* — Yee & Associates, P.C.

(57) ABSTRACT

Discovering second-order documents and latent custodians in an e-discovery system is provided. A list of first-order documents and document custodians within a base state of the e-discovery system are identified based on a plurality of terms corresponding to a meet and confer practice for a legal matter instance. The plurality of terms is masked within the first-order documents. The first-order documents having the plurality of terms masked are divided into groups. A list of second-order documents is generated from a group of documents. A list of second-order document custodians is generated based on corresponding custodian relationships to second-order documents. Finally, each second-order document custodian in the list of second-order document custodians that has a corresponding rank exceeding a defined rank threshold level is identified as an official document custodian in the e-discovery system.

19 Claims, 7 Drawing Sheets

(56) References Cited

U.S. PATENT DOCUMENTS

| | | | |
|---|---|---|---|
| 2011/0184935 A1* | 7/2011 | Marlin | G06Q 50/10 |
| | | | 707/719 |
| 2012/0259855 A1* | 10/2012 | Mizuguchi | G06F 16/285 |
| | | | 707/E17.046 |
| 2012/0310951 A1* | 12/2012 | Kumar | G06F 16/93 |
| | | | 707/E17.064 |
| 2014/0278663 A1 | 9/2014 | Samuel et al. | |
| 2015/0012448 A1 | 1/2015 | Bleiweiss et al. | |
| 2018/0349388 A1* | 12/2018 | Skiles | G06N 20/10 |
| 2021/0256160 A1* | 8/2021 | Hachey | G06N 5/003 |

* cited by examiner

DISCOVERING LATENT CUSTODIANS AND DOCUMENTS IN AN E-DISCOVERY SYSTEM

BACKGROUND

1. Field

The disclosure relates generally to e-discovery and more specifically to automatically discovering second-order ranked documents and document custodians in an e-discovery system using deep semantic, temporal and spatial document relationships corresponding to identified first-order documents in the e-discovery system.

2. Description of the Related Art

In the legal system, discovery is the legal process governing the right to obtain and the obligation to produce non-privileged matter relevant to any party's claims or defenses in litigation. In other words, it is the legal procedure by which parties are required to exchange information and evidence with one another. E-discovery is this legal discovery process applied to electronically stored information. Electronically stored information may include, for example, digital documents, email, social media posts, browser history, cellular telephone data, voicemail, digital audio and video recordings, global databases, applications, global positioning system data, cell tower data, data stored in an appliance, onboard computer data in a vehicle, or any digital record produced by a person. Unlike hardcopy evidence, electronically stored information is more dynamic and often contains metadata such as time-date stamps, author and recipient information, and file properties. Preserving the original content and metadata for electronically stored information is required in order to eliminate claims of spoliation or tampering with evidence later in the litigation.

E-discovery automates common discovery steps, such as, for example, data ingestion, file indexing, optical character recognition of documents, virus scanning, and the like, which prepares documents to be reviewed and produced. After data is identified by the parties on both sides of a legal matter, potentially relevant documents are placed under a legal hold, meaning these documents cannot be modified, deleted, erased, or otherwise destroyed. Potentially relevant data are collected and then extracted, indexed, and placed in storage (e.g., a database) of the e-discovery system. Once data is loaded into the e-discovery system, legal teams can begin reviewing the data, creating searches to find documents, sorting information by metadata fields, such as document creation date or document author, and tagging files as responsive, nonresponsive, by subject or legal element, and the like. E-discovery can also drastically reduce the amount of information requiring eyes-on review by allowing legal teams to quickly cull out extraneous files, such as duplicate files and information outside the scope of the review, to focus on the relevant data corresponding to the legal matter.

SUMMARY

According to one illustrative embodiment, a computer-implemented method for discovering second-order documents and document custodians in an e-discovery system is provided. A computer identifies a ranked list of first-order documents and first-order document custodians corresponding to first-order documents in the ranked list within the e-discovery system based on a plurality of terms corresponding to a legal matter instance obtained in a legal process. The computer masks the plurality of terms within the first-order documents. The computer, using a clustering algorithm, divides the first-order documents having the plurality of terms masked into ranked clusters with corresponding centroids. Each cluster is ranked, at least in part, on respective rankings of the first-order documents within the ranked list of first-order documents. The computer generates a ranked list of second-order documents from a group of documents that is based, at least in part, on respective document distances to the centroids of the ranked clusters. The computer generates a ranked list of second-order document custodians based, at least in part, on corresponding custodian relationships to second-order documents in the ranked list of second-order documents and respective rankings of the second-order documents within the ranked list of second-order documents. The computer identifies each second-order document custodian in the ranked list of second-order document custodians that has a corresponding rank exceeding a defined rank threshold level as an official document custodian in the e-discovery system. According to other illustrative embodiments, a computer system and computer program product for discovering second-order documents and document custodians in an e-discovery system are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
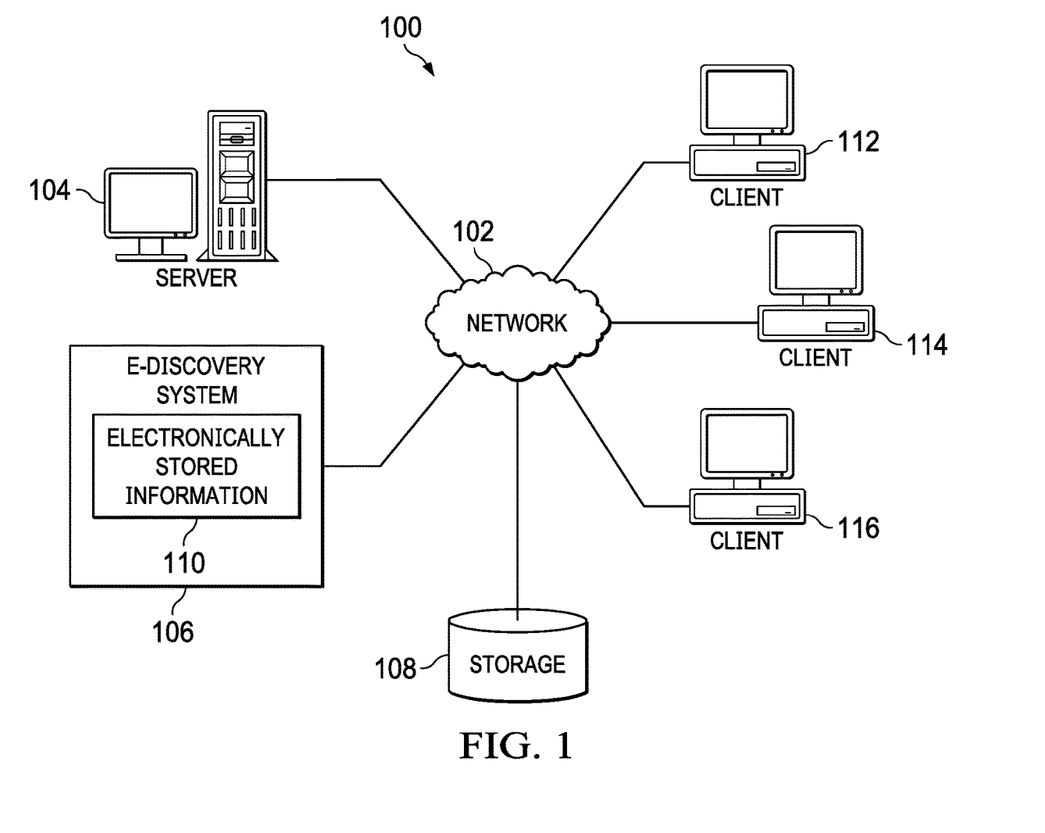
FIG. 1 is a pictorial representation of a network of data processing systems in which illustrative embodiments may be implemented.
Figure 2:
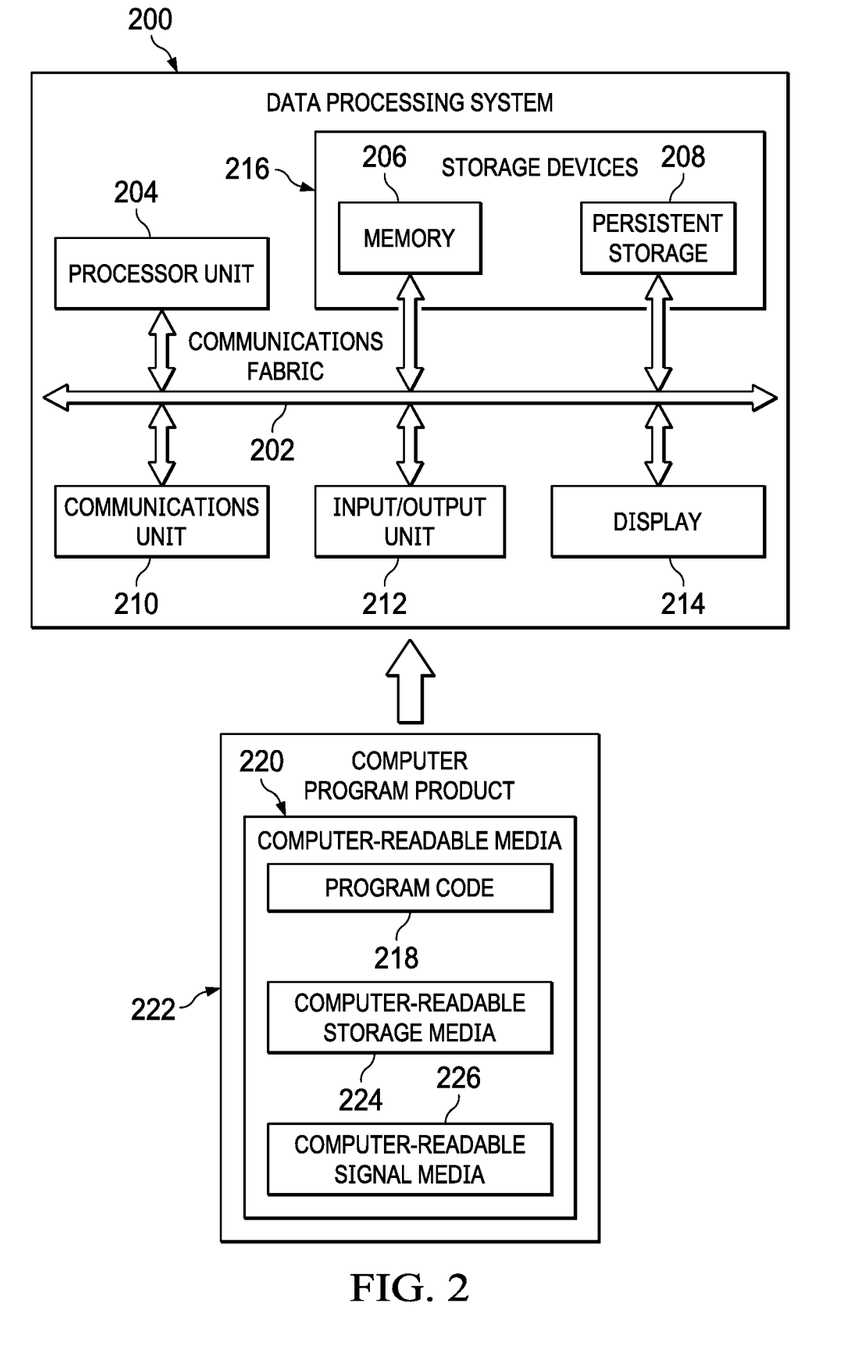
FIG. 2 is a diagram of a data processing system in which illustrative embodiments may be implemented.
Figure 3:
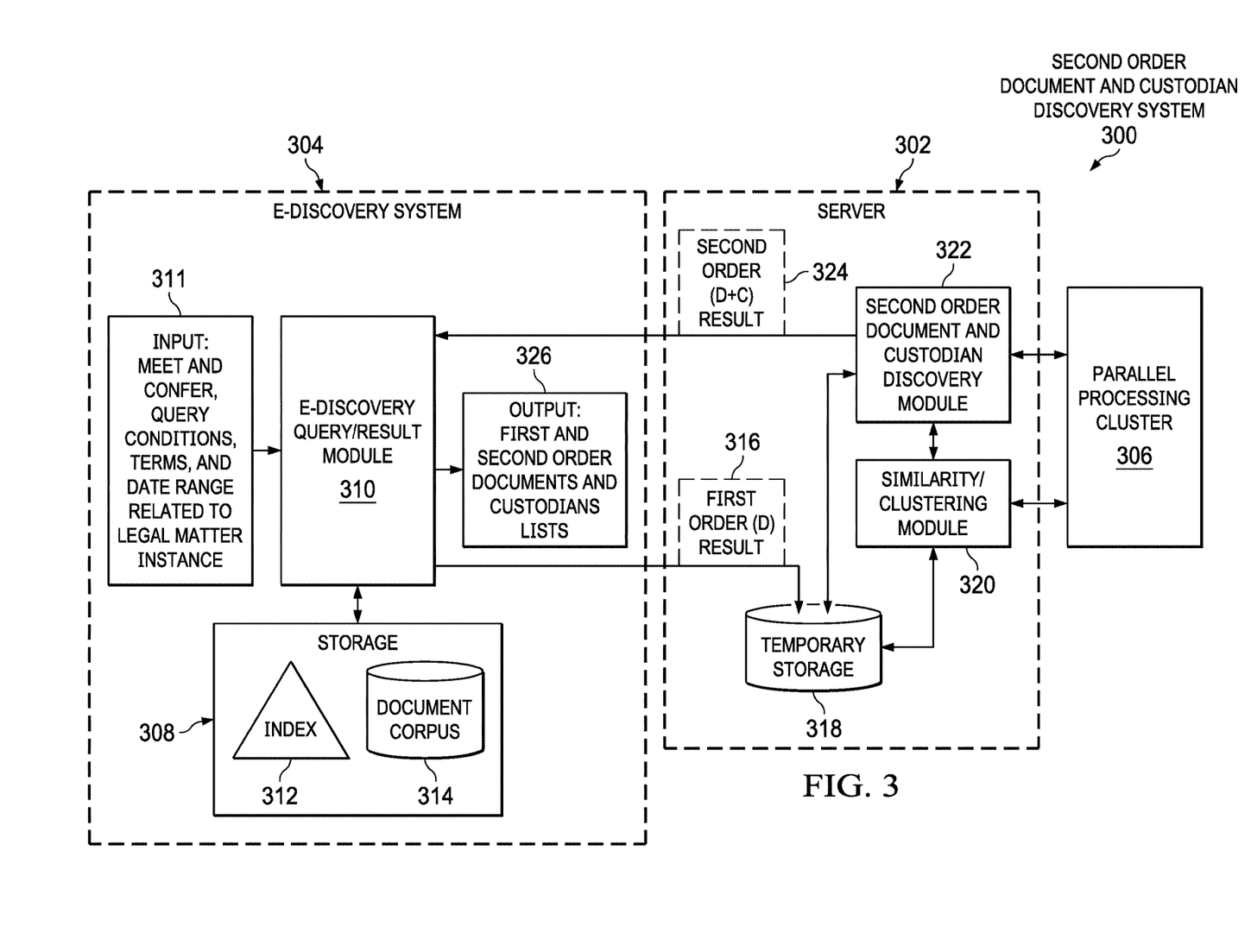
FIG. 3 is a diagram illustrating an example of a second-order document and document custodian discovery system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and e-discovery system 106 connect to network 102, along with storage 108. Server 104 and e-discovery system 106 may be, for example, computers with high-speed connections to network 102. Also, it should be noted that server 104 and e-discovery system 106 may each represent a plurality of computers in one or more data centers. Alternatively, server 104 and e-discovery system 106 may each represent multiple computing nodes in one or more cloud environments. In an alternative illustrative embodiment, server 104 may comprise e-discovery system 106 instead of e-discovery system 106 being a separate, stand-alone system.

In addition, server 104 provides a service to client device users for discovering second-order documents and document custodians within electronically stored information 110 located in e-discovery system 106. In this example, electronically stored information 110 corresponds to a legal matter instance that may involve a set of one or more organizations. An organization may be, for example, an enterprise, business, company, institution, agency, or the like. The legal matter instance may be any type of legal matter and may include, for example, current litigation or potential litigation involving a set of one or more entities, such as employees, contractors, customers, or the like, associated with the set of organizations. Electronically stored information 110 may include any type of digital data, such as documents, contracts, emails, voicemails, text messages, contact lists, social media posts, blogs, audio and video recordings, databases, applications, and the like. A document custodian is any person who has possession of, or has direct knowledge of, contents of one or more documents relevant to the legal matter instance involving the set of organizations.

Storage 108 is a network storage device capable of storing any type of data in a structured format or an unstructured format. In addition, storage 108 may represent a plurality of network storage devices. Further, in this example, storage 108 represents storage for a corpus of documents and data corresponding to the legal matter instance. Furthermore, storage 108 may store identifiers and network addresses for server 104 and e-discovery system 106 to allow access to storage 108 by server 104 and e-discovery system 106. Moreover, storage 108 may store authentication or credential data that may include user names, passwords, and biometric data, for example.

Client 112, client 114, and client 116 also connect to network 102. Clients 112, 114, and 116 are clients of server 104 and e-discovery system 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart televisions, and the like, with wire or wireless communication links to network 102. Users of clients 112, 114, and 116 may utilize clients 112, 114, and 116 to access and utilize the services provided by server 104 and e-discovery system 106.

It should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to e-discovery system 106 over network 102 for use on e-discovery system 106.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located for discovering second-order documents and document custodians in an e-discovery system, such as e-discovery system 106 in FIG. 1. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226.

In these illustrative examples, computer readable storage media 224 is a physical or tangible storage device used to store program code 218 rather than a medium that propagates or transmits program code 218. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 220" can be singular or plural. For example, program code 218 can be located in computer readable media 220 in the form of a single storage device or system. In another example, program code 218 can be located in computer readable media 220 that is distributed in multiple data processing systems. In other words, some instructions in program code 218 can be located in one data processing system while other instructions in program code 218 can be located in one or more other data processing systems. For example, a portion of program code 218 can be located in computer readable media 220 in a server computer while another portion of program code 218 can be located in computer readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Entities, such as employees, of an organization involved in legal matter instances, such as litigation or potential litigation, are referred to as document custodians because these entities have physical or electronic information regarding the legal matter instance. In an organization with a large number of employees, one or more employees may leave at any given point in time and the departure of these employees is often unknown to the legal department. This lack of knowledge by the legal department may create legal risk because the legal department may need to capture and preserve information, such as potential evidence, which was in the possession of a departing employee, for active or anticipated litigation. Typical employee exit procedures may include, for example, computer recycling and data destruction. Other employee exit procedures may include transferring the exiting employee to a manager or IT person. These typical employee exit procedures may occur without legal department approval or involvement. As a result, evidence may be lost during the employee exit procedures.

If a large organization is facing litigation, then the process of identifying relevant people and documents can be a long and costly task. Examples of litigation that may require e-discovery are patent infringement cases, harassment cases, unfair business practices, industrial espionage, and the like. Traditionally, the approach taken to identify relevant documents and document custodians may include: 1) attorneys involved in the litigation identify a list of litigation terms from a description of the case or from in-person meetings with relevant parties know as a meet and confer; 2) attorneys and/or paralegals create a legal matter for this litigation in an e-discovery system; 3) a data identification request is created and a search for relevant data within various information sources is conducted; 4) document custodians are identified based on discovered relevant data in the search and legal hold notices are sent to those document custodians; 5) paralegals review the identified documents and custodian confirmations; 6) attorneys conduct interviews with the document custodians potentially leading to more document custodians being identified; 7) data preservation requests are created to protect the identified evidence from accidental or deliberate removal from the e-discovery system; 8) data export requests are created to extract the documents identified as relevant; and 9) exported data is then shared with the court as well as with external attorneys. This process is repeated several times to identify the right set of custodians and documents throughout the life cycle of the litigation.

One issue with the traditional approach taken above is that of identifying all documents and entities in an organization relevant to a given legal matter or litigation. This process typically involves searching through all organizational documents for terms of interest, analyzing matching documents, and identifying people of interest based on their association with the matching documents. However, an association between a person and a document is loosely defined. A person associated with a particular document may include an author of the document, a person who sent the document, a person who received the document, any person mentioned in the document, a person who has read the document, any person in the same organizational unit as any of the people above, and the like. Identifying people of interest to a legal matter is typically a manual process and can be a slow and tedious endeavor. The process may be further complicated by a need to include people associated with a particular person who is associated with one or more relevant documents.

The process of identifying document custodians is often done by an independent external entity, such as a legal department or outside counsel. This may introduce another issue of protecting or restricting access to sensitive information. As a result, a document custodian identification process that is programmatic and automated is preferable. In addition, identifying document custodians without collecting data corresponding to currently active employees can reduce load on a data retention system. The data retention system can then focus on data corresponding to the former employees and pending litigation.

As an example scenario, a former employee is suing a manager of an organization for harassment. The starting point in this example is two document custodians. However, evidence may be with a larger set of employees who have physical, electronic, or other forms of evidence that should be included in the scope of the investigation. Illustrative embodiments are capable of automatically identifying these additional document custodians that are relevant to the legal matter instance. Illustrative embodiments are also capable of controlling the scope of the discovery (e.g., eliminating irrelevant custodians and data, which reduces cost) by limiting the discovery to a defined time range. In this example scenario, illustrative embodiments weight the time period more to control the scope and, therefore, the number of document custodians.

In another example scenario, in an organization where data retention policies are implemented (e.g., policy-driven data disposal), illustrative embodiments are capable of notifying the data retention system to remove document custodians from the scope of a particular legal matter. As a result, illustrative embodiments enable purging of data within the organization, which decreases cost overhead for future litigations where such data is not required (i.e., reduction of discovery cost corresponding to irrelevant data). However, illustrative embodiments are also capable of notifying the data retention system to maintain data (i.e., not purge data) when documents are subject to legal hold.

In a further example scenario, one organization sues another organization for patent infringement. In this example, the starting point may be either a set of employees (e.g., inventors, subject matter experts, and the like) or a set of documents (e.g., disclosure material, patent specification, claims, figures, and the like). Illustrative embodiments are capable of identifying relevant document custodians and increase the scope of discovery by weighting involved organizational departments differently (e.g., the patent inventor department is weighted high, the patent legal department is weighted medium, and the patent administrative department is weighted low). Illustrative embodiments may also utilize the date of the invention as a weight to restrict the time range corresponding to the discovery.

It should be noted that an entity (e.g., employee, manager, executive, board member, or the like) of an organization may have many different types of relationships with other entities in the organization. Also, these relationships may change over time for various reasons, such as promotions, departmental or work group change, organizational restructuring, and the like. If high document custodian identification is required, all these different relationships need to be identified in order to include all relevant document custodians who may not be directly involved with a particular legal matter, but have, or are aware of, relevant information corresponding to that particular legal matter. Examples of such relationships may include working on the same project, sharing documents, belonging to the same department, exchanging email messages (e.g., sender, recipient, or copied recipient), exchanging text messages, included in electronic chats, edited wiki pages, mentioned in blogs, and the like. As a result, identifying related document custodians using all known relationship types can be costly in terms of time and effort. Further, when a large organization is involved in a legal matter instance that involves a large number of document custodians, associating or, if needed, dissociating document custodians with the legal matter instance may also be costly. A system that could automatically identify relevant document custodians whenever a new relationship type is specified, would make the discovery process significantly faster, easier, and less costly.

Illustrative embodiments take into account and address the issues of document custodian identification in an e-discovery system within the scope of a legal matter by starting with a list of terms relevant to the legal matter or an initial set of people relevant to the legal matter. Illustrative embodiments expand the initial set of people (i.e., document custodians) by constructing a custodian graph based on documents relevant to the legal matter and discovered relationships between entities of the organization involved in the legal matter. One challenge lies in the discovery of entity relationships within the organization and resolution of entity identities within relevant documents.

Attorneys provide the list of terms (e.g., keywords) corresponding to the legal matter during a legal process known as a meet and confer. Illustrative embodiments utilize the list of terms to generate a search phrase (i.e., query). Illustrative embodiments use the search phrase to retrieve a ranked list of documents from the e-discovery system. Using patent infringement, or preemptively assessing the risk of patent infringement, as an example, in which relevant documents are a set of documents related to the patent that was infringed or potentially infringed. Illustrative embodiments associate each document in the set with one or more document custodians. Then, illustrative embodiments expand the list of document custodians using document metadata, as well as, techniques such as entity extraction from documents in the initial list of documents. Illustrative embodiments generate the custodian graph in which each vertex represents a document custodian and each edge between vertices denotes a relationship between document custodians corresponding to those vertices.

Alternatively, illustrative embodiments may start with a list of candidate document custodians, which was provided by the attorneys associated with the legal matter instance (e.g., harassment suit). If one or more of these candidate document custodians have multiple identifiers (i.e., identities) in the e-discovery system, then illustrative embodiments enumerate the different identities using an entity resolution mechanism. Illustrative embodiments utilize the complete set of identities corresponding to the candidate document custodians to retrieve relevant documents from the e-discovery system. Illustrative embodiments use these documents to identify additional document custodians in an iterative fashion. Illustrative embodiments utilize the final list of document custodians to build the custodian graph with vertices and edges as discussed above.

Whether starting with a list of terms or a list of candidate document custodians, illustrative embodiments can use transitive closure to expand the list of document custodians incrementally until illustrative embodiments achieve a desired level of document custodians (i.e., a defined minimum threshold number of document custodians). Transitive closure identifies a set of all vertices that can be reached from any starting vertex in the custodian graph. Transitive closure can be thought of as constructing a data structure that makes it possible to answer reachability. For example, can vertex d be reached from vertex a in one or more hops in the custodian graph. After transitive closure is constructed, it may be determined that vertex d is reachable from vertex a. If after transitive closure the number of document custodians is above a maximum number of document custodian threshold, then illustrative embodiments can cull the number of document custodians using a "litigation distance" metric, which is a function of one or more factors that illustrative embodiments use to determine relevance.

Illustrative embodiments weight the custodian graph {v, e} in which each vertex ("v") represents a document custodian and each edge ("e") represents the relationship between the document custodians corresponding to the two connected vertices. Illustrative embodiments generate the custodian graph using a set of document custodians and a heuristic to compute litigation distance between any two document custodians. This heuristic is a scoring function composed of variables that capture, for example, organizational relationships, collaboration history, common prior litigation, co-authored publications, shared documents, common projects, common contact lists, and the like, which illustrative embodiments weight appropriately to compute a relationship score between two document custodians. This relationship score is the litigation distance metric between respective document custodians. Illustrative embodiments can also utilize external social media networks to determine friend of a friend relationships between potential document custodians, which illustrative embodiments may then use to compute the relationship score. However, it should be noted that alternative illustrative embodiments may utilize different scoring functions or models to compute the litigation distance metric.

In addition to the litigation distance metric (i.e., document custodian relationship score), illustrative embodiments also associate each edge in the custodian graph with a time interval that indicates the timespan of the relationship between the two document custodians. If, for example, a legal matter pertains to a time interval that is before or after the timespan of a relevant document custodian's relationship with other entities of the organization, then illustrative embodiments may identify these other entities as not relevant to the legal matter and exclude these other entities from the e-discovery search.

Furthermore, illustrative embodiments also include an identity resolution mechanism that illustrative embodiments use to retrieve all known identities of a given document custodian. These different identities may include different email addresses corresponding to the given document custodian, different usernames on different organization subsystems, shared file system identifiers, shared database identifiers, and the like. Identity resolution helps to identify document custodians within documents so that illustrative embodiments can identify these document custodians as relevant to a particular legal matter. It should be noted that illustrative embodiments may be completely automated or may be semi-automated. In a semi-automated mode, illustrative embodiments can provide a human user with an intuitive user interface that gives the user a list of potential document custodians automatically identified by illustrative embodiments.

Consequently, illustrative embodiments are capable of proactively identifying latent document custodians corresponding to a legal matter so that legal holds can be issued and relevant data held. Furthermore, illustrative embodiments are capable of identifying document custodians relevant to other legal matters and notifying the legal department regarding those identified document custodians relevant to the other legal matters. As a result, illustrative embodiments enable legal teams working on different legal matters to collaborate and preserve relevant data appropriately where document custodians are involved in more than one legal matter.

Thus, illustrative embodiments provide one or more technical solutions that overcome a technical problem with discovering second-order documents and document custodians in an e-discovery system. As a result, these one or more technical solutions provide a technical effect and practical application in the field of e-discovery.

With reference now to FIG. 3, a diagram illustrating an example of a second-order document and document custodian discovery system is depicted in accordance with an illustrative embodiment. Second-order document and document custodian discovery system 300 may be implemented in a network of data processing systems, such as network data processing system 100 in FIG. 1. Second-order document and document custodian discovery system 300 is a system of hardware and software components for automatically discovering second-order ranked documents and document custodians in an e-discovery system using deep semantic, temporal and spatial document relationships corresponding to identified first-order documents in the e-discovery system.

In this example, second-order document and document custodian discovery system 300 includes server 302, e-discovery system 304, and parallel processing cluster 306. Server 302 and e-discovery system 304 may be, for example, server 104 and e-discovery system 106 in FIG. 1. Also in this example, e-discovery system 304 includes storage 308 and e-discovery query/result module 310. Storage 308 may be, for example, storage 108 in FIG. 1.

E-discovery query/result module 310 receives input 311. Input 311 includes, for example, meet and confer information, query conditions, a plurality of terms corresponding to a legal matter instance, and a date range related to the legal matter instance. In response to receiving input 311 corresponding to the legal matter instance, e-discovery query/result module 310 searches index 312 to retrieve first-order documents from document corpus 314. Document corpus 314 contains documents and data corresponding to the legal matter instance. E-discovery query/result module 310 sends first-order document ("D") result 316 to server 302. Server 302 stores first-order document result 316 in temporary storage 318.

Server 302 generates a list of first-order document custodians based on analyzing first-order document result 316 and identifying the first-order document custodians that correspond to first-order documents in first-order document result 316. In addition, similarity/clustering module 320 of server 302 generates similarity measures between the first-order documents in first-order document result 316. Afterward, similarity/clustering module 320 generates a plurality of document clusters based on the generated similarity measures between the first-order documents. It should be noted that similarity/clustering module 320 may utilize parallel processing cluster 306 to decrease processing time to calculate the similarity measures and generate the document clusters.

Then, second-order document and custodian discovery module 322 determines a distance metric from centroids of the plurality of document clusters to documents in document corpus 314 to identify other documents relevant to the legal matter instance involving the set of organizations. Second-order document and custodian discovery module 322 generates a list of second-order documents based on the determined distance metrics and then generates a list of second-order document custodians that correspond to the second-order documents in the list. Second-order document and custodian discovery module 322 may also utilize parallel processing cluster 306 to decrease processing time to calculate the distance metrics and generate the lists of second-order documents and document custodians.

Second-order document and custodian discovery module 322 sends second-order document and custodian ("D+C") result 324 to e-discovery system 304. In response to receiving second-order D+C result 324, e-discovery system 304 utilizes e-discovery query/result module 310 to generate output 326, which includes a first-order and second-order documents list and a first-order and second-order custodians list. E-discovery system 304 utilizes the first-order and second-order custodians list to send legal hold notices to document custodians. E-discovery system 304 utilizes the first-order and second-order documents list to send retention notices to a document retention system.

Also, a client device, such as client 112 in FIG. 1, which may correspond to an attorney associated with the legal matter instance involving the set of organizations, may retrieve output 326, which includes the first-order and second-order documents list and the first-order and second-order custodians list, from e-discovery system 304. Alternatively, server 302 may direct e-discovery system 304 to automatically send output 326 to a set of one or more client devices corresponding to attorneys associated with the legal matter instance.

Figure 4:
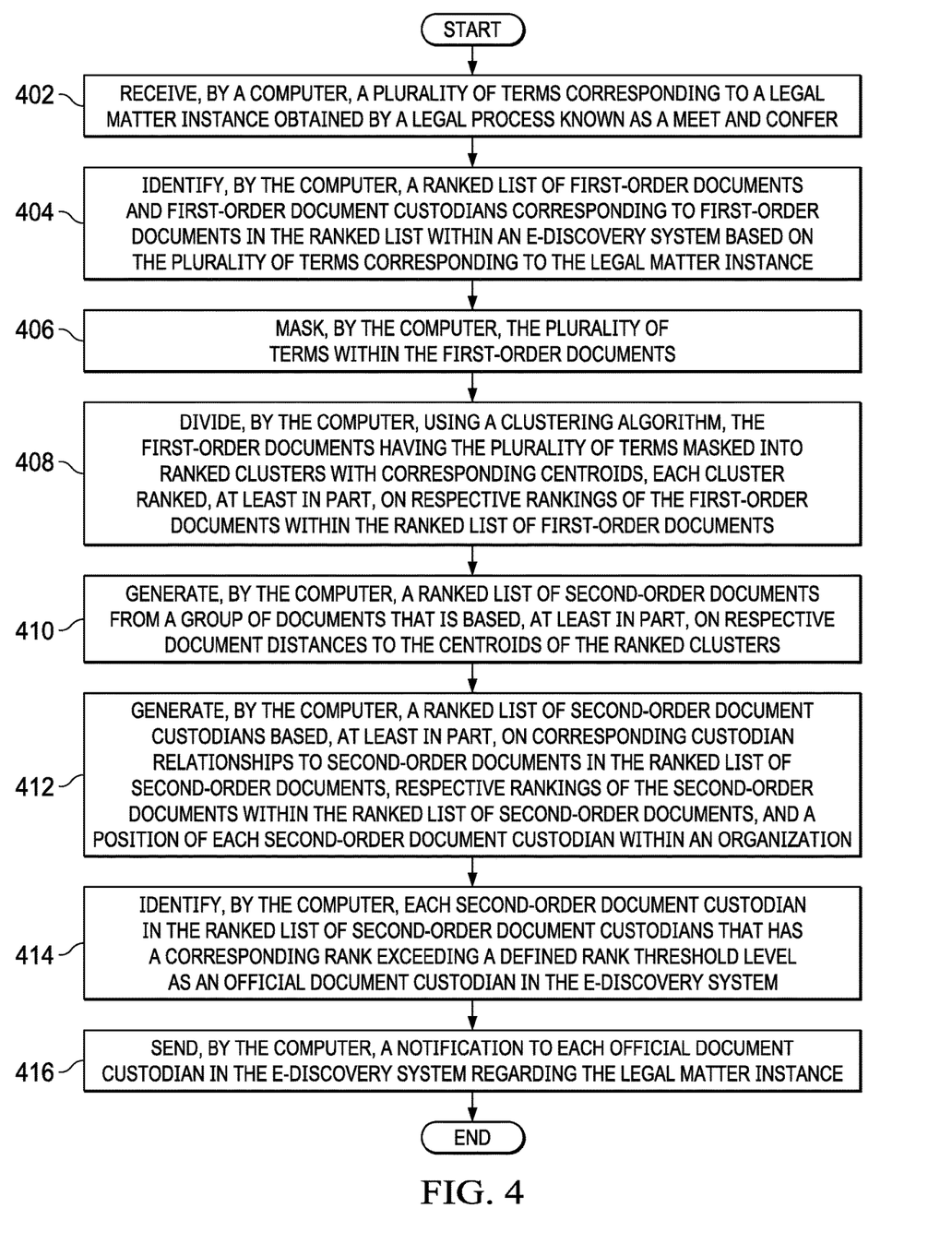
FIG. 4 is a flowchart illustrating a process for identifying official document custodians in an e-discovery system in accordance with an illustrative embodiment.

With reference now to FIG. 4, a flowchart illustrating a process for identifying official document custodians in an e-discovery system is shown in accordance with an illustrative embodiment. The process shown in FIG. 4 may be implemented in a computer, such as, for example, server 104 in FIG. 1, data processing system 200 in FIG. 2, or server 302 in FIG. 3.

The process begins when the computer receives a plurality of terms corresponding to a legal matter instance obtained by a legal process known as a meet and confer (step 402). The legal matter instance may involve one or more organizations. The computer identifies a ranked list of first-order documents and first-order document custodians corresponding to first-order documents in the ranked list within an e-discovery system based on the plurality of terms corresponding to the legal matter instance (step 404).

The computer masks the plurality of terms within the first-order documents (step 406). The computer, using a clustering algorithm, divides the first-order documents having the plurality of terms masked into ranked clusters with corresponding centroids (step 408). The computer ranks each cluster, at least in part, on respective rankings of the first-order documents within the ranked list of first-order documents.

The computer generates a ranked list of second-order documents from a group of documents that is based, at least in part, on respective document distances to the centroids of the ranked clusters (step 410). In addition, the computer generates a ranked list of second-order document custodians based, at least in part, on corresponding custodian relationships to second-order documents in the ranked list of second-order documents, respective rankings of the second-order documents within the ranked list of second-order documents, and a position of each second-order document custodian within an organization (step 412).

The computer identifies each second-order document custodian in the ranked list of second-order document custodians that has a corresponding rank exceeding a defined rank threshold level as an official document custodian in the e-discovery system (step 414). Further, the computer automatically sends a notification to each official document custodian in the e-discovery system regarding the legal matter instance (step 416). Thereafter, the process terminates.

Figure 5A:
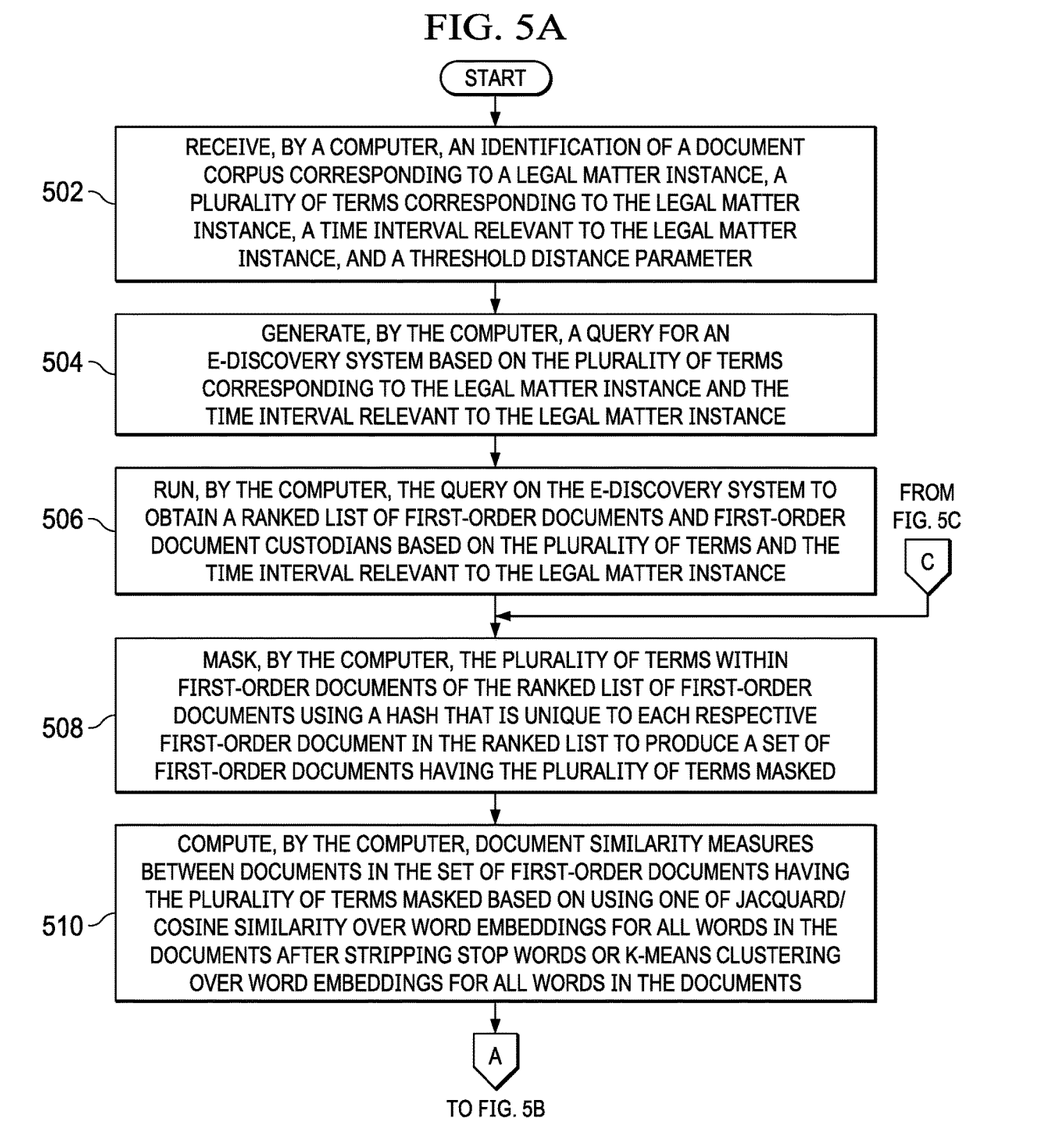
FIGS. 5A-5C are a flowchart illustrating a process for discovering second-order documents and document custodians in an e-discovery system in accordance with an illustrative embodiment.
Figure 5B:
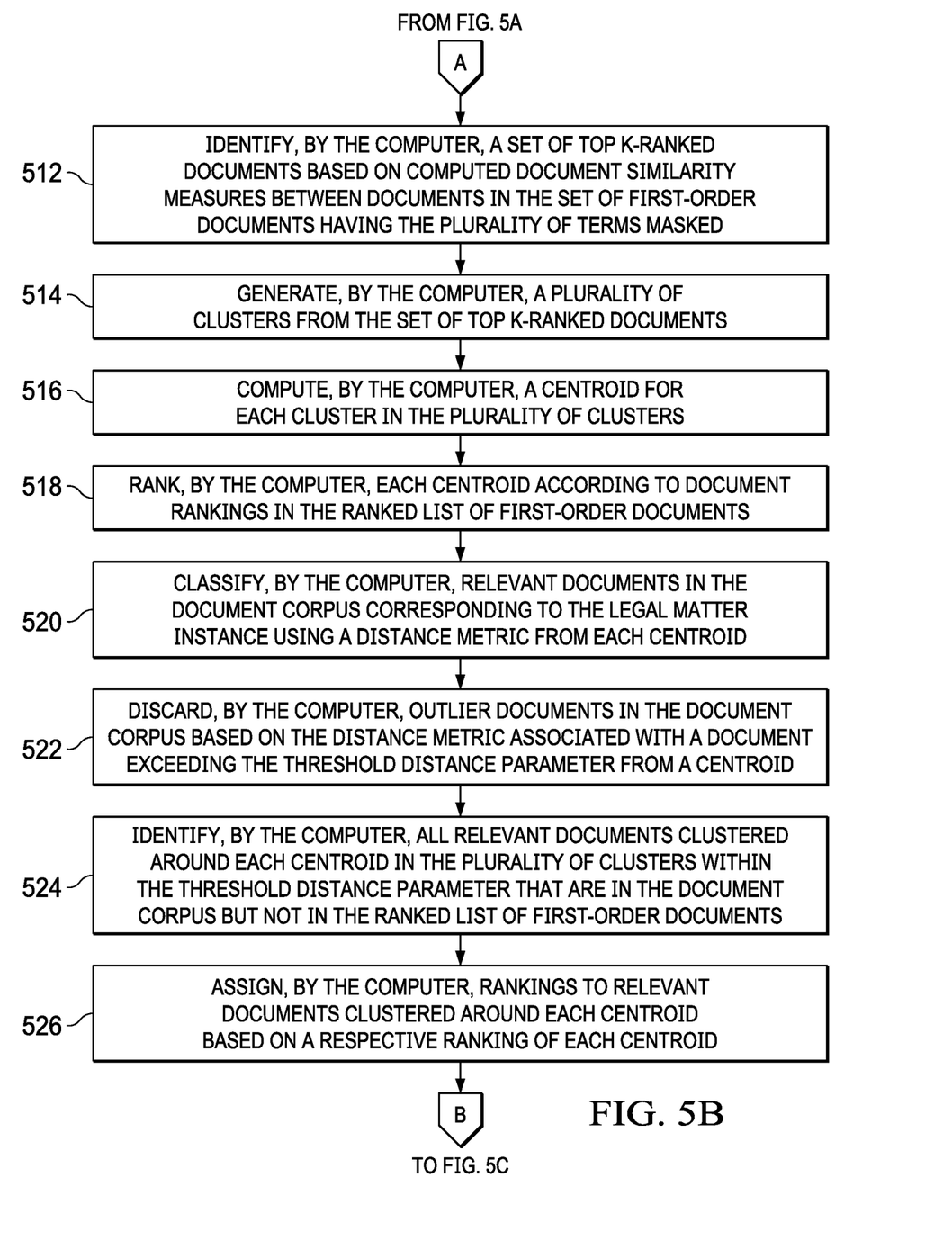
Figure 5C:
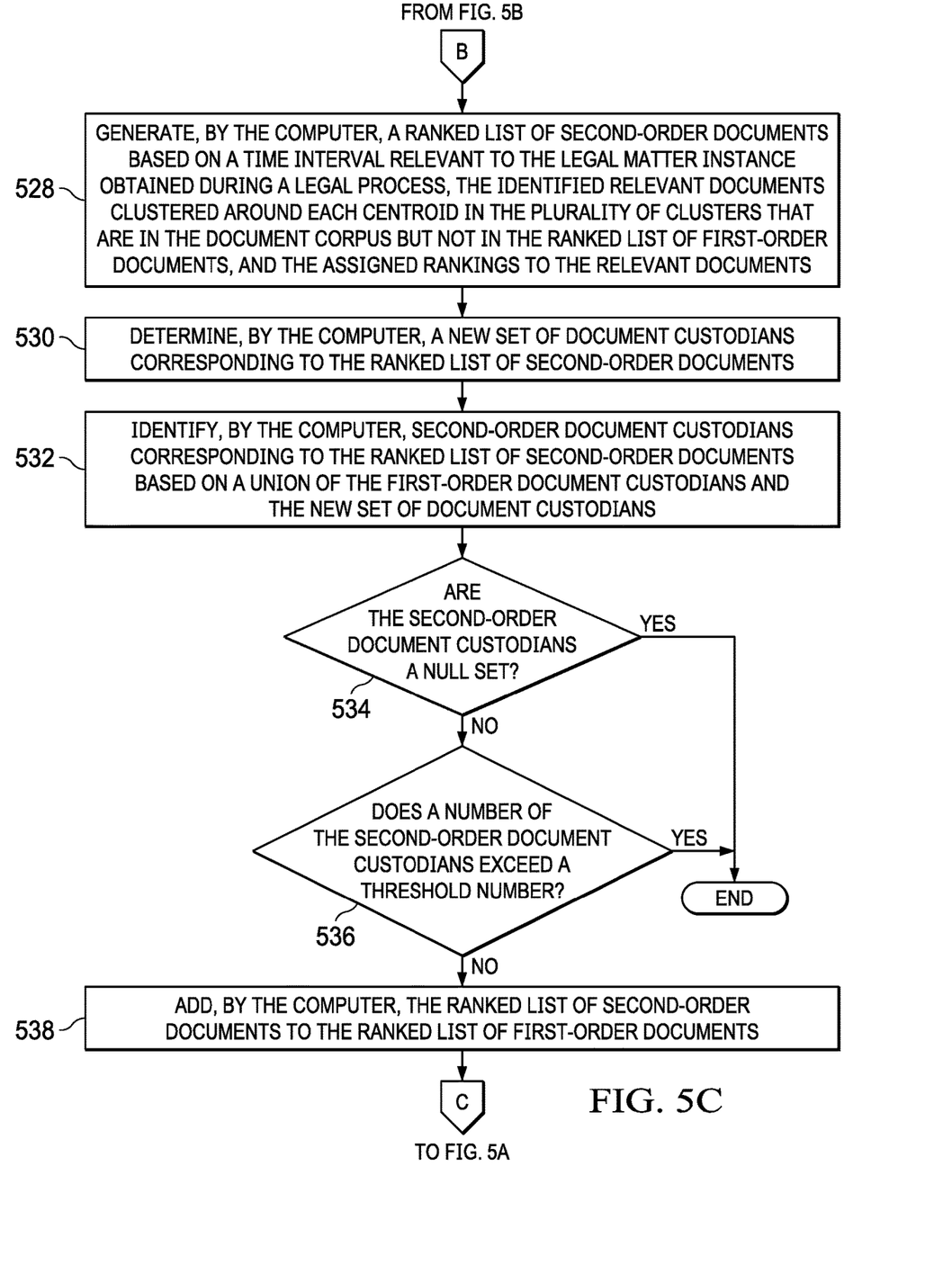

With reference now to FIGS. 5A-5C, a flowchart illustrating a process for discovering second-order documents and document custodians in an e-discovery system is shown in accordance with an illustrative embodiment. The process shown in FIGS. 5A-5C may be implemented in a computer, such as, for example, server 104 in FIG. 1, data processing system 200 in FIG. 2, or server 302 in FIG. 3.

The process begins when the computer receives an identification of a document corpus corresponding to a legal matter instance, a plurality of terms corresponding to the legal matter instance, a time interval relevant to the legal matter instance, and a threshold distance parameter (step 502). The computer generates a query for an e-discovery system based on the plurality of terms corresponding to the legal matter instance and the time interval relevant to the legal matter instance (step 504). The computer runs the query on the e-discovery system to obtain a ranked list of first-order documents and first-order document custodians based on the plurality of terms and the time interval relevant to the legal matter instance (step 506).

The computer masks the plurality of terms within first-order documents of the ranked list of first-order documents using a hash that is unique to each respective first-order document in the ranked list to produce a set of first-order documents having the plurality of terms masked (step 508). The computer may utilize a hashing algorithm, such as, for example, an MD5 message-digest algorithm, to generate the hash. The computer computes document similarity measures between documents in the set of first-order documents having the plurality of terms masked based on one of using Jacquard/Cosine similarity over word embeddings for all words in the documents after stripping stop words or using a k-means clustering algorithm over word embeddings for all words in the documents (step 510). The computer identifies a set of top k-ranked documents based on computed document similarity measures between documents in the set of first-order documents having the plurality of terms masked (step 512).

The computer generates a plurality of clusters from the set of top k-ranked documents (step 514). The computer computes a centroid for each cluster in the plurality of clusters (step 516). The computer ranks each centroid according to document rankings in the ranked list of first-order documents (step 518).

The computer classifies relevant documents in the document corpus corresponding to the legal matter instance using a distance metric from each centroid (step 520). The computer also discards outlier documents in the document corpus corresponding to the legal matter instance based on the distance metric associated with a document exceeding the threshold distance parameter from a centroid (step 522). The computer identifies all relevant documents clustered around each centroid in the plurality of clusters within the threshold distance parameter that are in the document corpus but not in the ranked list of first-order documents (step 524).

The computer assigns rankings to relevant documents clustered around each centroid based on a respective ranking of each centroid (step 526). The computer generates a ranked list of second-order documents based on the time interval relevant to the legal matter instance obtained during a legal process, the identified relevant documents clustered around each centroid in the plurality of clusters that are in the document corpus but not in the ranked list of first-order documents, and the assigned rankings to the relevant documents (step 528).

Further, the computer determines a new set of document custodians corresponding to the ranked list of second-order documents (step 530). The computer identifies second-order document custodians corresponding to the ranked list of second-order documents based on a union of the first-order document custodians and the new set of document custodians (step 532). The computer makes a determination as to whether the second-order document custodians are a null set (step 534).

If the computer determines that the second-order document custodians are a null set, yes output of step 534, then the process terminates thereafter. If the computer determines that the second-order document custodians are not a null set, no output of step 534, then the computer makes a determination as to whether a number of the second-order document custodians exceeds a threshold number of document custodians (step 536).

If the computer determines that the number of the second-order document custodians does exceed the threshold number of document custodians, yes output of step 536, then the process terminates thereafter. If the computer determines that the number of the second-order document custodians does not exceed the threshold number of document custodians, no output of step 536, then the computer adds the ranked list of second-order documents to the ranked list of first-order documents (step 538). Thereafter, the process returns to step 508 where the computer masks terms in the second-order documents.

Thus, illustrative embodiments of the present invention provide a computer-implemented method, computer system, and computer program product for automatically discovering second-order ranked documents and document custodians in an e-discovery system using deep semantic, temporal and spatial document relationships corresponding to identified first-order documents in the e-discovery system. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for discovering second-order documents and document custodians in an e-discovery system, the computer-implemented method comprising:
    identifying, by a computer, a ranked list of first-order documents and first-order document custodians corresponding to first-order documents in the ranked list within the e-discovery system based on a plurality of terms corresponding to a legal matter instance obtained in a legal process;
    masking, by the computer, the plurality of terms within the first-order documents;
    dividing, by the computer, using a clustering algorithm, the first-order documents having the plurality of terms masked into one or more ranked clusters with corresponding centroids, each cluster ranked, at least in part, on respective rankings of the first-order documents within the ranked list of first-order documents;
    generating, by the computer, a ranked list of second-order documents from a group of documents that is based, at least in part, on respective document distances to the centroids of the ranked clusters, wherein the second-order documents are not included in the first-order documents and wherein adding the ranked list of second-order documents to the ranked list of first-order documents further comprises:
        determining, by the computer, whether the second-order document custodians is a null set;
        responsive to the computer determining that the second-order document custodians are not a null set, determining, by the computer, whether a number the second-order document custodians exceeds a threshold number; and
        responsive to the computer determining that the number of the second-order document custodians does not exceed a threshold number, adding, by the computer, the ranked list of second-order document to the ranked list of first-order documents;
    generating, by the computer, a ranked list of second-order document custodians based, at least in part, on corresponding custodian relationships to second-order documents in the ranked list of second-order documents and respective rankings of the second-order documents within the ranked list of second-order documents; and
    identifying, by the computer, each second-order document custodian in the ranked list of second-order document custodians that has a corresponding rank exceeding a defined rank threshold level as an official document custodian in the e-discovery system.

2. The computer-implemented method of claim 1 further comprising:
    sending, by the computer, a notification to each official document custodian in the e-discovery system regarding the legal matter instance.

3. The computer-implemented method of claim 1 further comprising:

receiving, by the computer, an identification of a document corpus corresponding to the legal matter instance, the plurality of terms corresponding to the legal matter instance, a time interval relevant to the legal matter instance, and a threshold distance parameter;

generating, by the computer, a query for the e-discovery system based on the plurality of terms corresponding to the legal matter instance and the time interval relevant to the legal matter instance; and running, by the computer, the query on the e-discovery system to obtain the ranked list of first-order documents and first-order document custodians based on the plurality of terms and the time interval relevant to the legal matter instance.

4. The computer-implemented method of claim 1 further comprising:

masking, by the computer, the plurality of terms within the first-order documents of the ranked list of first-order documents using a hash that is unique to each respective first-order document in the ranked list to produce a set of first-order documents having the plurality of terms masked.

5. The computer-implemented method of claim 4 further comprising:

computing, by the computer, document similarity measures between documents in the set of first-order documents having the plurality of terms masked based on using one of using jacquard/cosine similarity over word embeddings for all words in the documents after stripping stop words or k-means clustering over word embeddings for all words in the documents; and identifying, by the computer, a set of top k-ranked documents based on computed document similarity measures between documents in the set of first-order documents having the plurality of terms masked.

6. The computer-implemented method of claim 5 further comprising:

generating, by the computer, the one or more ranked clusters from the set of top k-ranked documents;

computing, by the computer, a centroid for each cluster in the one or more ranked clusters; and ranking, by the computer, each centroid according to document rankings in the ranked list of first-order documents.

7. The computer-implemented method of claim 6 further comprising:

classifying, by the computer, relevant documents in a document corpus corresponding to the legal matter instance using a distance metric from each centroid; and discarding, by the computer, outlier documents in the document corpus based on the distance metric associated with a document exceeding a threshold distance parameter from a centroid.

8. The computer-implemented method of claim 7 further comprising:

identifying, by the computer, all relevant documents clustered around each centroid in the one or more ranked clusters within the threshold distance parameter that are in the document corpus but not in the ranked list of first-order documents;

assigning, by the computer, rankings to relevant documents clustered around each centroid based on a respective ranking of each centroid; and generating, by the computer, the ranked list of second-order documents based on a time interval relevant to the legal matter instance obtained in the legal process, identified relevant documents clustered around each centroid in the one or more ranked clusters that are in the document corpus but not in the ranked list of first-order documents, and assigned rankings to the relevant documents.

9. The computer-implemented method of claim 1 further comprising:

determining, by the computer, a new set of document custodians corresponding to the ranked list of second-order documents; and identifying, by the computer, second-order document custodians corresponding to the ranked list of second-order documents based on a union of the first-order document custodians and the new set of document custodians.

10. The computer-implemented method of claim 1, wherein ranking second-order document custodians in the ranked list of second-order document custodians is further based on a position of each second-order document custodian within an organization.

11. A computer system for discovering second-order documents and document custodians in an e-discovery system, the computer system comprising:

a bus system;

a storage device connected to the bus system, wherein the storage device stores program instructions; and a processor connected to the bus system, wherein the processor executes the program instructions to:

identify a ranked list of first-order documents and first-order document custodians corresponding to first-order documents in the ranked list within the e-discovery system based on a plurality of terms corresponding to a legal matter instance obtained in a legal process;

mask the plurality of terms within the first-order documents;

divide, using a clustering algorithm, the first-order documents having the plurality of terms masked into one or more ranked clusters with corresponding centroids, each cluster ranked, at least in part, on respective rankings of the first-order documents within the ranked list of first-order documents;

generate a ranked list of second-order documents from a group of documents that is based, at least in part, on respective document distances to the centroids of the ranked clusters, wherein the second-order documents are not included in the first-order documents and wherein adding the ranked list of second-order documents to the ranked list of first-order documents further comprises:

determine whether the second-order document custodians is a null set;

responsive to determining that the second-order document custodians are not a null set, determine whether a number the second-order document custodians exceeds a threshold number; and responsive to determining that the number of the second-order document custodians does not exceed a threshold number, add the ranked list of second-order document to the ranked list of first-order documents;

generate a ranked list of second-order document custodians based, at least in part, on corresponding custodian relationships to second-order documents in the ranked list of second-order documents and respective rankings of the second-order documents within the ranked list of second-order documents; and identify each second-order document custodian in the ranked list of second-order document custodians that has a corresponding rank exceeding a defined rank threshold level as an official document custodian in the e-discovery system.

12. The computer system of claim 11, wherein the processor further executes the program instructions to:
send a notification to each official document custodian in the e-discovery system regarding the legal matter instance.

13. The computer system of claim 11, wherein the processor further executes the program instructions to:
receive an identification of a document corpus corresponding to the legal matter instance, the plurality of terms corresponding to the legal matter instance, a time interval relevant to the legal matter instance, and a threshold distance parameter;
generate a query for the e-discovery system based on the plurality of terms corresponding to the legal matter instance and the time interval relevant to the legal matter instance; and
run the query on the e-discovery system to obtain the ranked list of first-order documents and first-order document custodians based on the plurality of terms and the time interval relevant to the legal matter instance.

14. The computer system of claim 11, wherein the processor further executes the program instructions to:
mask the plurality of terms within the first-order documents of the ranked list of first-order documents using a hash that is unique to each respective first-order document in the ranked list to produce a set of first-order documents having the plurality of terms masked.

15. A computer program product for discovering second-order documents and document custodians in an e-discovery system, the computer program product comprising a computer readable storage medium having program instructions embodied therewith, the program instructions executable by a computer to cause the computer to perform a method comprising:
identifying, by a computer, a ranked list of first-order documents and first-order document custodians corresponding to first-order documents in the ranked list within the e-discovery system based on a plurality of terms corresponding to a legal matter instance obtained in a legal process;
masking, by the computer, the plurality of terms within the first-order documents;
dividing, by the computer, using a clustering algorithm, the first-order documents having the plurality of terms masked into one or more ranked clusters with corresponding centroids, each cluster ranked, at least in part, on respective rankings of the first-order documents within the ranked list of first-order documents;
generating, by the computer, a ranked list of second-order documents from a group of documents that is based, at least in part, on respective document distances to the centroids of the ranked clusters, wherein the second-order documents are not included in the first-order documents and wherein adding the ranked list of second-order documents to the ranked list of first-order documents further comprises:
determining, by the computer, whether the second-order document custodians is a null set;
responsive to the computer determining that the second-order document custodians are not a null set, determining, by the computer, whether a number the second-order document custodians exceeds a threshold number; and
responsive to the computer determining that the number of the second-order document custodians does not exceed a threshold number, adding, by the computer, the ranked list of second-order document to the ranked list of first-order documents;
generating, by the computer, a ranked list of second-order document custodians based, at least in part, on corresponding custodian relationships to second-order documents in the ranked list of second-order documents and respective rankings of the second-order documents within the ranked list of second-order documents; and
identifying, by the computer, each second-order document custodian in the ranked list of second-order document custodians that has a corresponding rank exceeding a defined rank threshold level as an official document custodian in the e-discovery system.

16. The computer program product of claim 15 further comprising:
sending, by the computer, a notification to each official document custodian in the e-discovery system regarding the legal matter instance.

17. The computer program product of claim 15 further comprising:
receiving, by the computer, an identification of a document corpus corresponding to the legal matter instance, the plurality of terms corresponding to the legal matter instance, a time interval relevant to the legal matter instance, and a threshold distance parameter;
generating, by the computer, a query for the e-discovery system based on the plurality of terms corresponding to the legal matter instance and the time interval relevant to the legal matter instance; and
running, by the computer, the query on the e-discovery system to obtain the ranked list of first-order documents and first-order document custodians based on the plurality of terms and the time interval relevant to the legal matter instance.

18. The computer program product of claim 15 further comprising:
masking, by the computer, the plurality of terms within the first-order documents of the ranked list of first-order documents using a hash that is unique to each respective first-order document in the ranked list to produce a set of first-order documents having the plurality of terms masked.

19. The computer program product of claim 18 further comprising:
computing, by the computer, document similarity measures between documents in the set of first-order documents having the plurality of terms masked based on using one of using jacquard/cosine similarity over word embeddings for all words in the documents after stripping stop words or k-means clustering over word embeddings for all words in the documents; and
identifying, by the computer, a set of top k-ranked documents based on computed document similarity measures between documents in the set of first-order documents having the plurality of terms masked.

* * * * *